United States Patent
Zheng et al.

(10) Patent No.: US 11,251,992 B2
(45) Date of Patent: Feb. 15, 2022

(54) DATA TRANSMISSION METHOD AND PROCESSING METHOD, AND DEVICE

(71) Applicant: COMBA TELECOM SYSTEMS (CHINA) LIMITED, Guangdong (CN)

(72) Inventors: Ziyong Zheng, Guangdong (CN); Chengxin Hu, Guangdong (CN)

(73) Assignee: Comba Network Systems Company Limited, Guangdong (CN)

( * ) Notice: Subject to any disclaimer, the term of this patent is extended or adjusted under 35 U.S.C. 154(b) by 0 days.

(21) Appl. No.: 16/649,414

(22) PCT Filed: Aug. 1, 2018

(86) PCT No.: PCT/CN2018/098166
§ 371 (c)(1),
(2) Date: Mar. 20, 2020

(87) PCT Pub. No.: WO2019/056863
PCT Pub. Date: Mar. 28, 2019

(65) Prior Publication Data
US 2020/0304339 A1    Sep. 24, 2020

(30) Foreign Application Priority Data

Sep. 21, 2017 (CN) .......................... 201710860616.X

(51) Int. Cl.
*H04L 29/06* (2006.01)
*H04W 28/06* (2009.01)
*H04L 12/46* (2006.01)

(52) U.S. Cl.
CPC .......... *H04L 12/4633* (2013.01); *H04L 69/04* (2013.01); *H04L 69/22* (2013.01); *H04W 28/06* (2013.01)

(58) Field of Classification Search
None
See application file for complete search history.

(56) References Cited

U.S. PATENT DOCUMENTS 7,420,992 B1 * 9/2008 Fang .................... H04L 12/4633
370/477
7,649,909 B1 * 1/2010 Archard .............. H04L 12/4633
370/477
(Continued)

FOREIGN PATENT DOCUMENTS

| CN | 101034956 A | 9/2007 |
|---|---|---|
| CN | 101616081 A | 12/2009 |

(Continued)

OTHER PUBLICATIONS

International Search Report (ISR) and Written Opinion of the International Searching Authority (ISA/CN) issue in Application No. PCT/CN2018/098166, dated Oct. 8, 2018. 9 pages including English translation of ISR.

Primary Examiner — Kenny S Lin
(74) Attorney, Agent, or Firm — Meunier Carlin & Curfman LLC

(57) ABSTRACT

Disclosed in the present invention are a data transmission method and processing method, and a device, which are used for improving the compression effect on an original message during tunnel transmission, wherein the data transmission method comprises: obtaining an original message to be transmitted and a current reference message, the current reference message and the original message being transmitted in the same tunnel; differentiating and compressing the original message and the current reference message to obtain an information message; encapsulating the information message by using a tunneling protocol to generate a tunnel message, the tunnel message comprising a compression information header, and the compression information header comprising a reference message identifier corresponding to the current reference message; and sending the tunnel message. With the disclosed method, each message in the same tunnel have a certain correlation. Therefore, the differentia- (Continued)

| IP Header | GRE Header | PPP Header | Compression information header | Information message/reference message (reference message: original message) |
|---|---|---|---|---|

PPTP Frame format

| IP Header | UDP Header | L2TP Header | PPP Header | Compression information header | Information message/reference message (reference message: original message) |
|---|---|---|---|---|---|

L2TP Frame format

| IP Header | AH Header | Compression information header | Information message/reference message (reference message: original message) | |
|---|---|---|---|---|
| IP Header | ESP Header | Compression information header | Information message/reference message (reference message: original message) | ESP Trailer |

Ipsec Frame format tion result obtained after the original message and the current reference message are differentiated is more regular, the information entropy thereof is smaller and a better compression effect may be obtained.

16 Claims, 11 Drawing Sheets

(56) References Cited

U.S. PATENT DOCUMENTS

| | | | | |
|---|---|---|---|---|
| 8,976,798 | B2* | 3/2015 | Border | H04L 12/4641 |
| | | | | 370/401 |
| 2003/0226017 | A1* | 12/2003 | Palekar | H04L 63/08 |
| | | | | 713/168 |
| 2005/0138186 | A1 | 6/2005 | Hesselink et al. | |
| 2005/0149481 | A1 | 7/2005 | Hesselink et al. | |
| 2006/0244587 | A1* | 11/2006 | Humphries | G07C 5/008 |
| | | | | 340/539.13 |
| 2008/0046616 | A1 | 2/2008 | Verzunov et al. | |
| 2008/0089339 | A1* | 4/2008 | Tsirtsis | H04W 28/06 |
| | | | | 370/392 |
| 2008/0089357 | A1* | 4/2008 | Park | H03M 7/30 |
| | | | | 370/465 |
| 2008/0271137 | A1* | 10/2008 | Sinn | H04L 12/4633 |
| | | | | 726/15 |
| 2012/0170571 | A1* | 7/2012 | Antonelli | H04L 69/04 |
| | | | | 370/352 |
| 2015/0043349 | A1* | 2/2015 | Zhu | H04W 28/02 |
| | | | | 370/235 |
| 2017/0126845 | A1* | 5/2017 | Pole | H04L 45/745 |
| 2017/0357280 | A1* | 12/2017 | Peloso | G05F 1/66 |
| 2018/0276350 | A1* | 9/2018 | Land | H04L 9/083 |
| 2018/0295069 | A1* | 10/2018 | Smith | H04L 65/4092 |

FOREIGN PATENT DOCUMENTS

| | | |
|---|---|---|
| CN | 101827031 A | 9/2010 |
| CN | 103618903 A | 3/2014 |
| CN | 107749815 A | 3/2018 |

\* cited by examiner

DATA TRANSMISSION METHOD AND PROCESSING METHOD, AND DEVICE

This application is a National Stage of International Application No. PCT/CN2018/098166, filed Aug. 1, 2018, which claims priority to Chinese Patent Application No. 201710860616.X, filed with the Chinese Patent Office on Sep. 21, 2017 and entitled "DATA TRANSMISSION METHOD AND PROCESSING METHOD, AND DEVICE", which is incorporated herein by reference in its entirety.

FIELD

The present disclosure relates to the field of communications, and in particular, to a method for transmitting data and a method for processing data, and an apparatus.

BACKGROUND

In the field of communications, a tunneling technology is often involved. For example, virtual private networks (VPN) that are widely used in the Internet, 2G/3G/4G communication access networks, and the like adopt the tunneling technology. With the tunneling technology, original messages of different protocols can be encapsulated according to tunneling protocols and sent through tunnels. Message headers encapsulated according to the tunneling protocols contain routing information for network transmission.

In the process of data transmission, bandwidth resources are often scarce, and the cost of artificially increasing bandwidth resources is sometimes expensive. Therefore, in an existing tunneling technology, original messages are usually compressed first and then encapsulated according to the tunneling protocols to save bandwidth resources.

However, the compression effect of the original messages, such as the compression ratio, mostly depends on the specific content of the original messages. Higher regularity of the content leads to a lower information entropy and a better compression effect. If all characters of the original messages are the same, the compression effect is best. Conversely, lower regularity of the content leads to a higher information entropy and a poorer compression effect. For example, it is nearly impossible to compress random numbers. As for the existing tunneling technology, as the uncertainty of the specific content of the original messages is very high, the compression effect of the existing tunneling technology is undesirable, and the bandwidth resources cannot be saved effectively.

SUMMARY

The present disclosure provides a method for transmitting data and method for processing data, and apparatus, to improve the compression effect of original messages in tunnel messages.

An embodiment of the present disclosure provides a method for transmitting data, including: obtaining the original messages to be transmitted and current reference messages, where the current reference messages and the original messages are transmitted in the same tunnel; differentiating and compressing the original messages and the current reference messages to obtain information messages; encapsulating the information messages by using tunneling protocols to generate the tunnel messages, where the tunnel messages include compression information headers, and the compression information headers include reference message identifiers corresponding to the current reference messages; and sending the tunnel messages.

Optionally, before obtaining the current reference messages, the method further includes: determining whether the original messages meet a reference message update criterion, and obtaining the current reference messages if the original messages do not meet the reference message update criterion.

Optionally, the method further includes: if the original messages meet the reference message update criterion, updating the current reference messages based on the original messages and updating the reference message identifiers of the current reference messages; and encapsulating the original messages by using the tunneling protocols to generate the tunnel messages, where the tunnel messages include the compression information headers, and the compression information headers include the reference message identifiers corresponding to the current reference messages.

Optionally, the compression information headers further include update identifiers, and the update identifiers are configured to indicate that the original messages corresponding to the tunnel messages are the current reference messages.

An embodiment of the present disclosure provides a method for processing data, including: receiving the tunnel messages; decapsulating the tunnel messages to obtain the information messages, where the information messages are obtained by differentiating and compressing the original messages and the reference messages, and the reference messages and the original messages are transmitted in the same tunnel; obtaining the reference messages based on the reference message identifiers included in the compression information headers of the tunnel messages; and obtaining the original messages based on the information messages and the reference messages.

Optionally, before the decapsulating the tunnel messages to obtain the information messages, the method further includes: determining whether the update identifiers in the compression information headers of the tunnel messages are set values; and if the update identifiers in the compression information headers of the tunnel messages are the set values, decapsulating the tunnel messages to obtain the information messages.

Optionally, the method further includes: if the update identifiers in the compression information headers of the tunnel messages are not the set values, decapsulating the tunnel messages to obtain the original messages, and associating and storing the original messages and the reference message identifiers in the compression information headers.

An embodiment of the present disclosure provides a data transmission apparatus, including: a processing element, configured to obtain the original messages to be transmitted and the current reference messages by using a transceiver element, where the current reference messages and the original messages are transmitted in the same tunnel; the processing element is further configured to differentiate and compress the original messages and the current reference messages to obtain the information messages; the processing element is further configured to encapsulate the information messages by using the tunneling protocols to generate the tunnel messages, where the tunnel messages include the compression information headers, and the compression information headers include the reference message identifiers corresponding to the current reference messages; and the processing element is further configured to control the transceiver element to send the tunnel messages.

Optionally, the processing element is further configured to: determine whether the original messages meet a reference message update criterion, and obtain the current reference messages if the original messages do not meet the reference message update criterion.

Optionally, the processing element is further configured to: if the original messages meet the reference message update criterion, update the current reference messages based on the original messages and update the reference message identifiers of the current reference messages; and encapsulate the original messages by using the tunneling protocols to generate the tunnel messages, where the tunnel messages include the compression information headers, and the compression information headers include the reference message identifiers corresponding to the current reference messages.

Optionally, the compression information headers further include the update identifiers, and the update identifiers are configured to indicate that the original messages corresponding to the tunnel messages are the current reference messages.

An embodiment of the present disclosure provides a data processing apparatus, including: a transceiver element, configured to receive the tunnel messages; and a processing element, configured to decapsulate the tunnel messages to obtain the information messages, where the information messages are obtained by differentiating and compressing the original messages and the reference messages, and the reference messages and the original messages are transmitted in the same tunnel; the processing element is further configured to obtain the reference messages based on the reference message identifiers included in the compression information headers of the tunnel messages; and the processing element is further configured to obtain the original messages based on the information messages and the reference messages.

Optionally, the processing element is further configured to: determine whether the update identifiers in the compression information headers of the tunnel messages are the set values; and if the update identifiers in the compression information headers of the tunnel messages are the set values, decapsulate the tunnel messages to obtain the information messages.

Optionally, the processing element is further configured to: if the update identifiers in the compression information headers of the tunnel messages are not the set values, decapsulate the tunnel messages to obtain the original messages, and associate and store the original messages and the reference message identifiers in the compression information headers.

An embodiment of the present disclosure provides a computer readable storage medium. The computer readable storage medium stores computer executable instructions, and the computer executable instructions are configured to make a computer perform any one of the foregoing data transmission methods.

An embodiment of the present disclosure provides a computing device, including: a memory, configured to store program instructions; and a processor, configured to invoke the program instructions stored in the memory, and perform any one of the foregoing data transmission methods based on the obtained program instructions.

An embodiment of the present disclosure provides a computer readable storage medium. The computer readable storage medium stores computer executable instructions, and the computer executable instructions are configured to make a computer perform any one of the foregoing data processing methods.

An embodiment of the present disclosure provides the computing device, including: the memory, configured to store program instructions; and the processor, configured to invoke the program instructions stored in the memory, and perform any one of the foregoing data processing methods based on the obtained program instructions.

An embodiment of the present disclosure further provides a computer program product. The computer program product includes computer programs stored in a non-transient computer readable storage medium, where the computer programs include computer executable instructions, and when the computer executable instructions are executed by a computer, the computer performs any one of the data transmission methods or data processing methods according to the embodiments of the present disclosure.

In conclusion, the embodiments of the present disclosure provide the data transmission methods and processing methods, and the apparatuses, where the data transmission method includes: obtaining the original messages to be transmitted and the current reference messages, where current reference messages and original messages are transmitted in the same tunnel; differentiating and compressing the original messages and the current reference messages to obtain the information messages; encapsulating the information messages by using the tunneling protocols to generate the tunnel messages, where the tunnel messages include the compression information headers, and the compression information headers include the reference message identifiers corresponding to the current reference messages; and sending the tunnel messages. The messages in the same tunnel have a certain correlation. Because the original messages and the current reference messages are in the same tunnel, a differentiation result obtained after differentiating the original messages and the current reference messages is more regular than the original messages and has a smaller information entropy than the original messages. Therefore, the effect of compressing the differentiation result is better than that of directly compressing the original messages in the related art.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION OF THE EMBODIMENTS

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by those of ordinary skilled in the art based on the embodiments of the present disclosure without creative efforts shall fall within the protection scope of the present disclosure.

Figure 1:
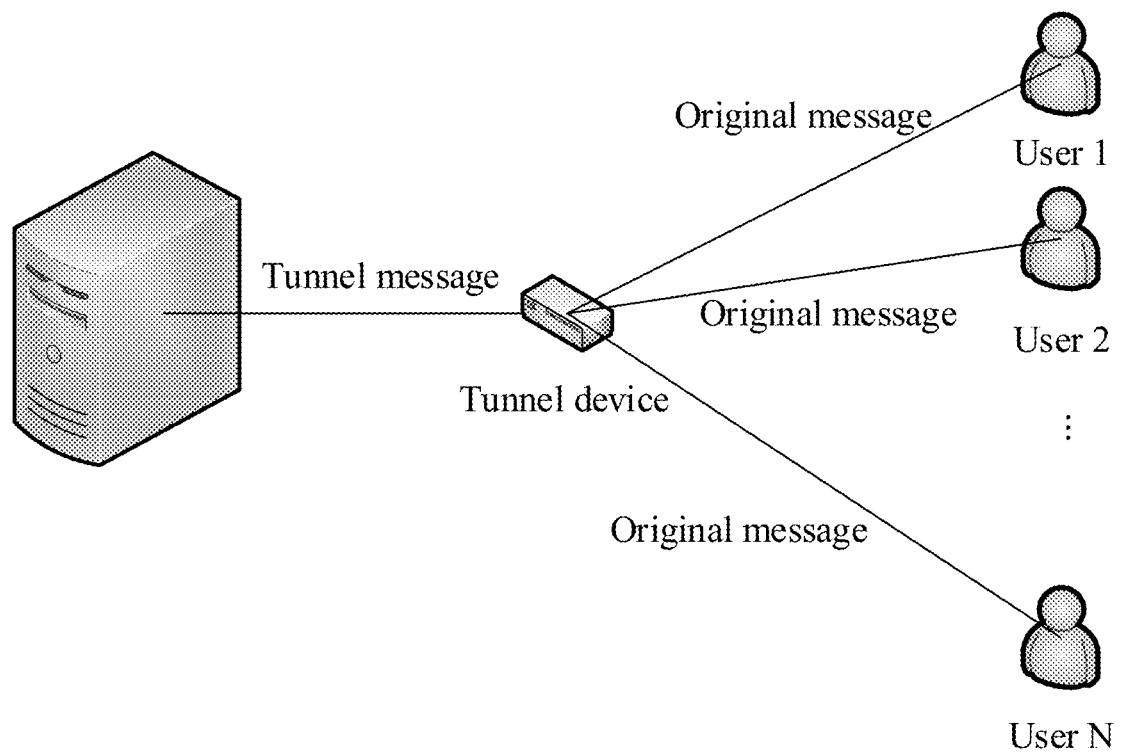
FIG. 1 is a schematic interaction diagram of tunnel transmission according to an embodiment of the present disclosure.

The tunnel transmission technology is a common network transmission technology. FIG. 1 is a schematic interaction diagram of tunnel transmission according to an embodiment of the present disclosure. As shown in FIG. 1, a tunnel device (such as a VPN) provides user 1, user 2, . . . , and user N with tunnel transmission services. Data of the N users access a network server through the tunnel device. In a specific application process, the tunnel device assigns different IP addresses to the N users. Although these IP addresses are different, they have certain similarities. The users construct original messages and send the original messages to the tunnel device, and message headers of the original messages contain IP address information assigned to the users by the tunnel device. Thus, it can be seen that original messages in the same tunnel have at least the same or similar IP address information, so that the original messages in the same tunnel have a certain correlation. Certainly, the above is just an example using the IP addresses. In a specific implementation process, transmission control protocol (TCP) and user datagram protocol (UDP) information in the original messages also has a certain correlation.

Figure 2:
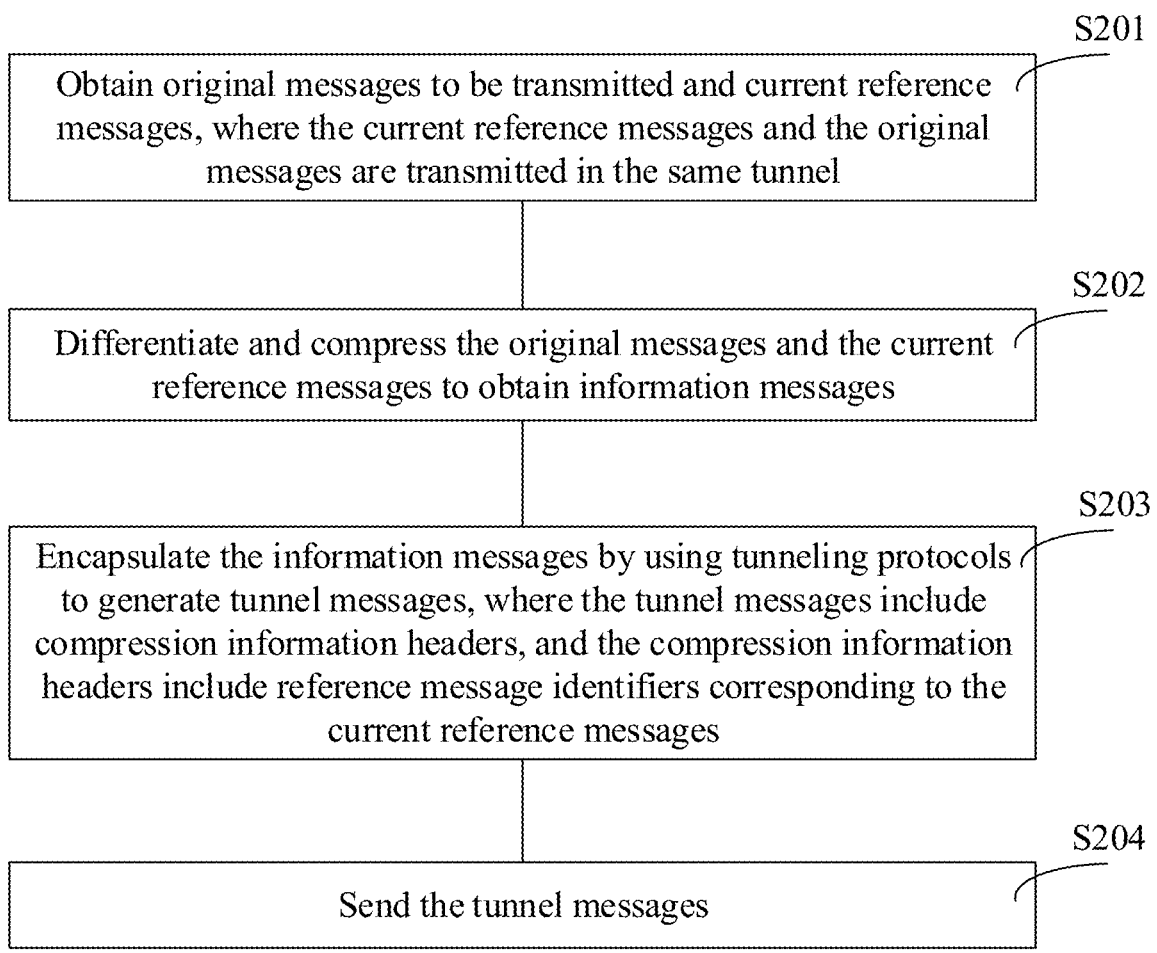
FIG. 2 is a schematic flowchart of a method for transmitting data according to an embodiment of the present disclosure.

FIG. 2 is a schematic flowchart of a method for transmitting data according to an embodiment of the present disclosure. As shown in FIG. 2, the method includes the following steps.

S201: Obtain original messages to be transmitted and current reference messages. The current reference messages and the original messages are transmitted in the same tunnel.

S202: Differentiate and compress the original messages and the current reference messages to obtain information messages.

S203: Encapsulate the information messages by using tunneling protocols to generate tunnel messages. The tunnel messages include compression information headers, and the compression information headers include reference message identifiers corresponding to the current reference messages.

S204: Send the tunnel messages.

In S201, the current reference messages may be historical original messages transmitted in the tunnel, or may be reference messages specially designed based on the characteristics of the original message in the tunnel, so that the current reference messages have the sufficiently correlation with the original messages to be transmitted. Optionally, when the current reference messages are the historical original messages transmitted in the tunnel, the current reference messages are updated constantly based on a preset reference message update criterion to improve the correlation between the current reference messages and the original messages to be transmitted. Specifically, before obtaining the current reference messages in S201, the method further includes: determining whether the original messages meet the reference message update criterion, and obtaining the current reference messages if the original messages do not meet the reference message update criterion; or updating the current reference messages based on the original messages if the original messages meet the reference message update criterion. The reference message update criterion can be determined based on actual application environments. For example, every fourth original messages may be determined as the reference message.

In S202, when the original messages do not meet the reference message update criterion, differentiation is performed on the original messages and the current reference messages. As the original messages and the reference messages are transmitted in the same tunnel, they have the certain correlation, and a differentiation result is more regular. When exclusive or (xor) differentiation is used as an example, characters in the differentiation result are mainly 0, only a few characters are 1. The differentiation result can be compressed according to conventional compression algorithms such as Lempel ziv oberhumer (lzo) and zlib, to obtain a better compression effect, that is, a compressed file is smaller than the differentiation result. Therefore, the information messages in the embodiment of the present disclosure are far smaller than a file obtained by directly compressing an original file in the related art.

In S203, the tunneling protocols may be the point-to-point tunneling protocol (PPTP), the layer 2 tunneling protocol (L2TP), the IP security protocol (IPSec), or another tunnel transmission protocol. This is not limited by this embodiment of the present disclosure. Optionally, when the original messages do not meet the reference message update criterion, the information messages in S202 are encapsulated according to the tunneling protocols. When the original messages meet the reference message update criterion, the original messages are encapsulated according to the tunneling protocols to generate the tunnel messages. The tunnel messages further include the compression information headers, and the compression information headers include the reference message identifiers corresponding to the current reference messages in S202. Optionally, when the original messages meet the reference message update criterion, the reference message identifiers of the current reference messages are updated while the current reference messages are updated based on the original messages. The reference message identifiers included in the compression information headers of the tunnel messages generated by encapsulating the original messages according to the tunneling protocols are the reference message identifiers corresponding to the original messages.

Figure 3:
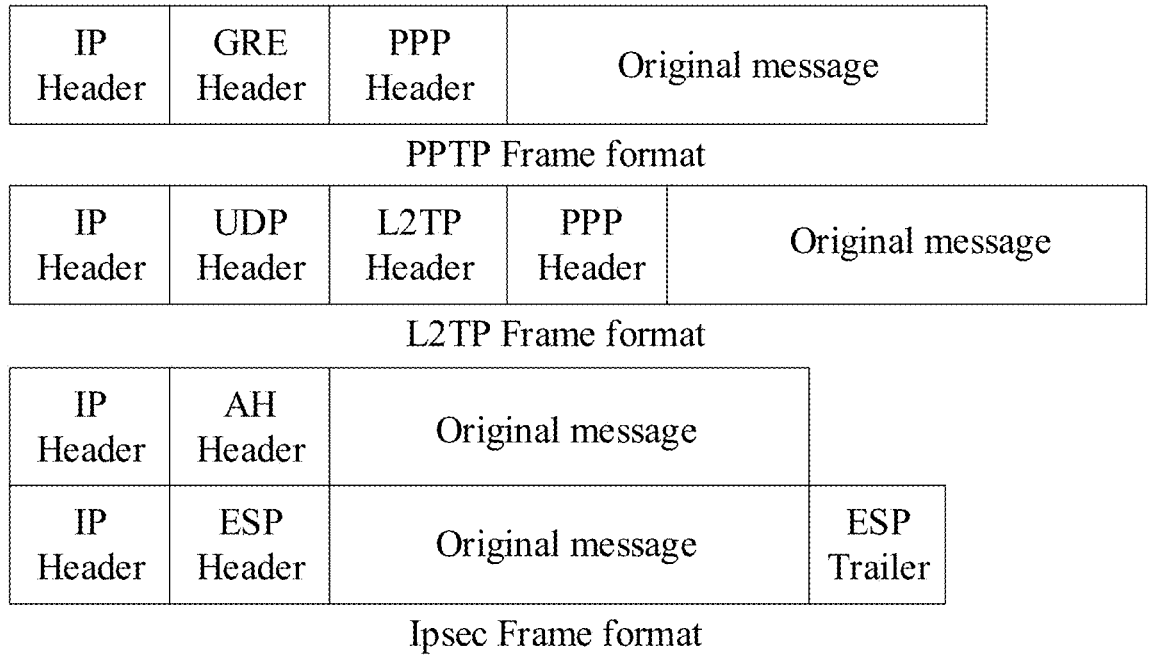
FIG. 3 is a schematic diagram of an existing tunnel message frame format.
Figure 4:
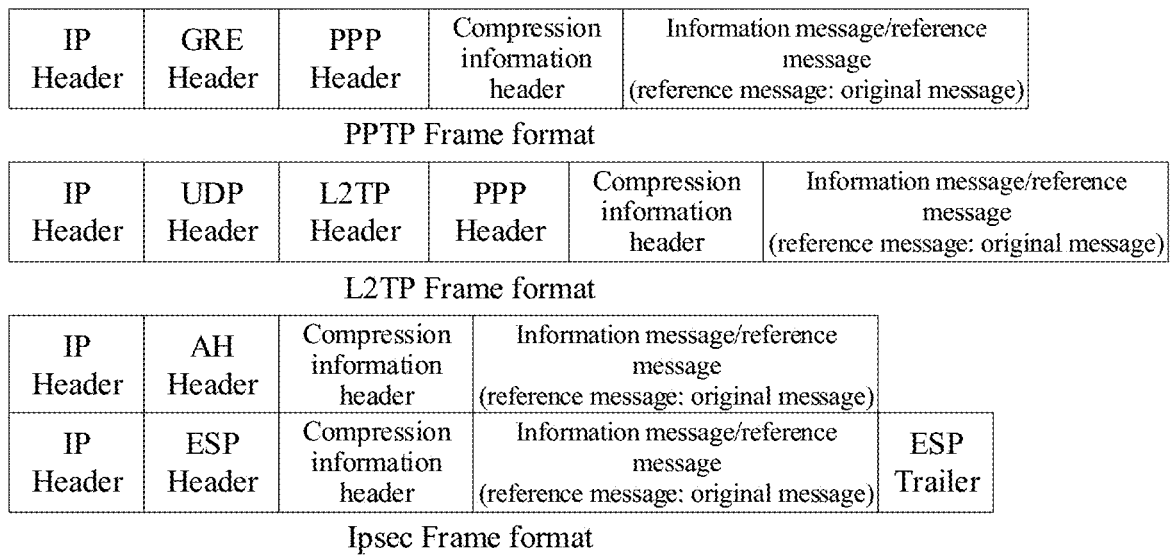
FIG. 4 is a schematic diagram of a tunnel message frame format according to an embodiment of the present disclosure.

FIG. 3 is a schematic diagram of an existing tunnel message frame format. FIG. 4 is a schematic diagram of a tunnel message frame format according to an embodiment of the present disclosure. As shown in FIG. 3 and FIG. 4, frame formats in the different tunneling protocols provided by this embodiment of the present disclosure are similar to the existing frame format. Both the frame format in the PPTP protocol and the existing frame format have IP headers, generic route encapsulation (GRE) headers, point-to-point protocol (PPP) headers, and the like. Both the frame format in the L2TP protocol and the existing frame format have IP headers, UDP headers, L2TP headers, PPP headers, and the like. Both the frame format in the IPSec protocol and the existing frame format have IP headers, authentication headers (AH), encapsulating security protocol (ESP) headers, ESP trailers, and the like. The difference is that the original messages are directly compressed and encapsulated in the related art, but the frame format in this embodiment of the disclosure carries the compression information headers and the information messages (or the original messages used as the reference messages).

The tunnel messages provided by this embodiment of the present disclosure can be sent in S204 in an existing tunnel message sending manner.

The messages in the same tunnel have the certain correlation. Because the original messages and the current reference messages are in the same tunnel, the differentiation result obtained after differentiating the original messages and the current reference messages is more regular than the original messages and has a smaller information entropy than the original messages. Therefore, the effect of compressing the differentiation result is better than that of directly compressing the original messages in the related art.

Figure 5:
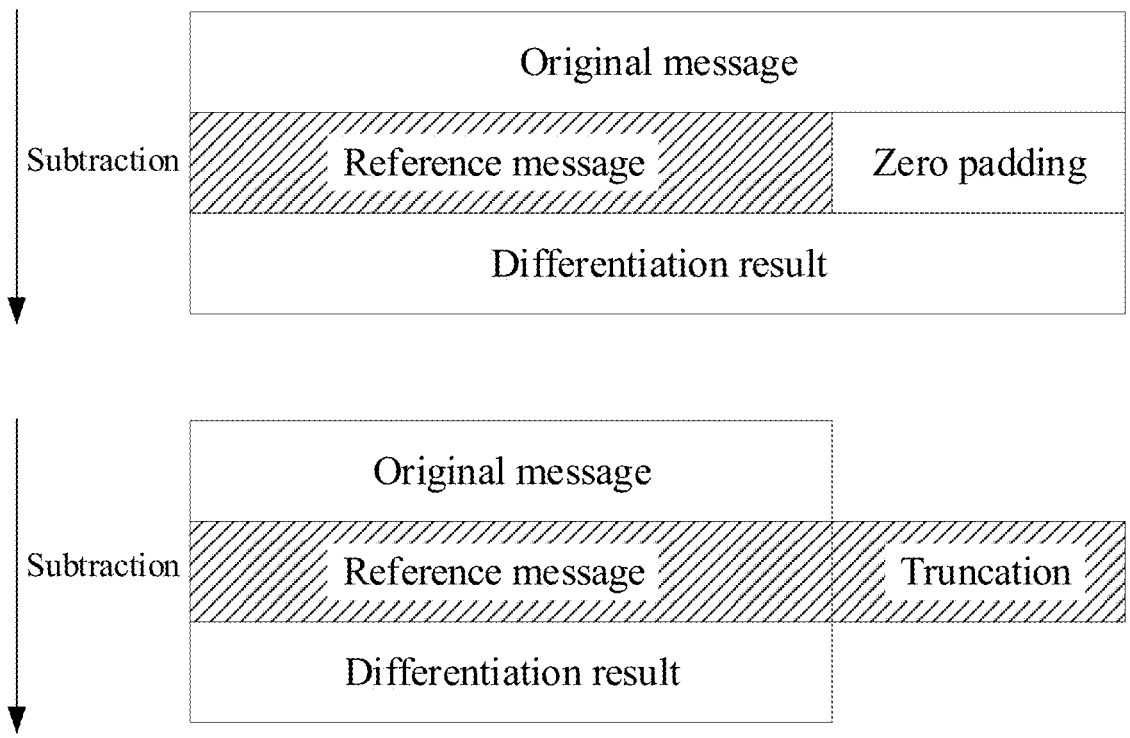
FIG. 5 is a schematic diagram of a differentiation process according to an embodiment of the present disclosure.

In S202, the original messages that do not meet the reference message update criterion need to be differentiated. This embodiment of the present disclosure provides a feasible implementation of differentiating the original messages and the current reference messages. FIG. 5 is a schematic diagram of a differentiation process according to an embodiment of the present disclosure. As shown in FIG. 5, the original messages and the reference messages that are to be differentiated are not necessarily the same in length. When the reference messages are relatively short, low zero padding is performed on the reference messages to make the reference messages have the same length as the original messages. When the reference messages are relatively long, the reference messages are truncated from the least significant bits to make the reference messages have the same length as the original messages. Then, subtraction is performed on characters at the same bits of the original messages and the reference messages to obtain the differentiation result with the same length as the original messages.

Figure 6:
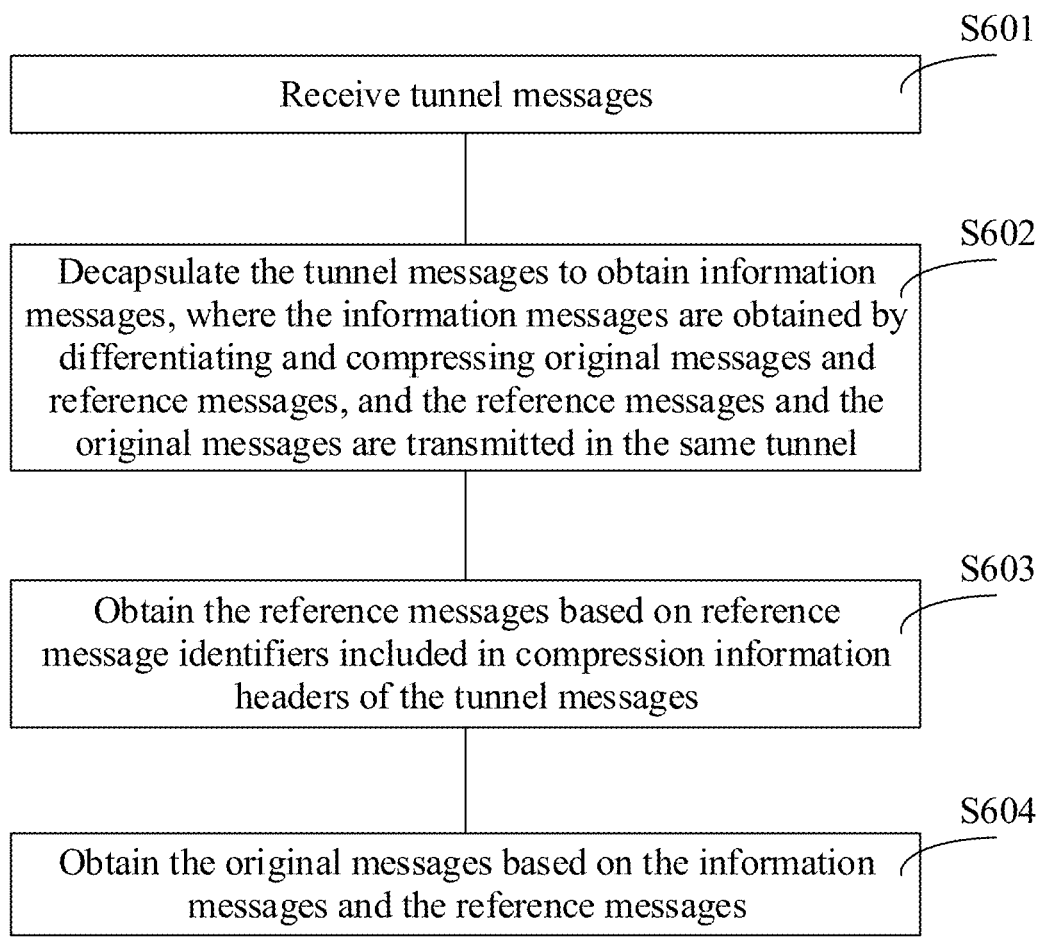
FIG. 6 is a schematic flowchart of a method for processing data according to an embodiment of the present disclosure.

Corresponding to the method for transmitting data, an embodiment of the present disclosure further provides a method for processing data that can be used to process the tunnel messages transmitted according to the foregoing data transmission method. FIG. 6 is a schematic flowchart of a data processing method according to an embodiment of the present disclosure. As shown in FIG. 6, the method includes the following steps.

S601: Receive the tunnel messages.

S602: Decapsulate tunnel messages to obtain the information messages, where the information messages are obtained by differentiating and compressing the original messages and the reference messages, and the reference messages and the original messages are transmitted in the same tunnel.

S603: Obtain the reference messages based on the reference message identifiers included in the compression information headers of the tunnel messages.

S604: Obtain the original messages based on the information messages and the reference messages.

In S602, the tunnel messages can be decapsulated according to an operation similar to the related art, to remove the message headers of the tunnel messages, such as the IP header, GRE header, PPP header or the like in the PPTP frame format in FIG. 4, thereby obtaining the information messages. The tunnel messages provided by this embodiment of the present disclosure may further include the original messages used as the reference messages, so that the original messages in the tunnel messages may also be obtained after decapsulating the tunnel messages.

In an ideal scenario, a receiver of the tunnel messages can determine whether the messages obtained after decapsulating the tunnel messages are the information messages or the original messages by determining whether the reference message identifiers in the compression information headers are changed.

Specifically, if the reference message identifiers are not changed when being compared with the reference message identifiers in the tunnel messages received last time, the messages obtained after decapsulation are the information messages; or if the reference message identifiers are changed when being compared with the reference message identifiers in the tunnel messages received last time, the messages obtained after decapsulation are the original messages used as the reference messages.

In an actual operation process, the receiving sequence of the tunnel messages may be inconsistent with the sending sequence of the tunnel messages, that is, the tunnel messages sent in a later sequence is received in an earlier sequence. In this case, a determining error occurs.

To avoid such a case, optionally, the compression information headers further include the update identifiers. The update identifiers indicate whether the original messages corresponding to the tunnel messages are the reference messages.

For example, when the update identifiers are 0, it indicates that the original messages corresponding to the tunnel messages are the reference messages. In this case, the messages obtained after decapsulating the tunnel messages are the original messages used as the reference messages. When the update identifiers are 1, it indicates that the original messages corresponding to the tunnel messages are not the reference messages. In this case, the messages obtained after decapsulating the tunnel messages are the information messages.

Optionally, when it is determined that the messages obtained after decapsulating the tunnel messages are the original messages used as the reference messages, the original messages and the reference message identifiers in the compression information headers are recorded in an associated manner. When the reference messages are used for inverse differentiation, the corresponding reference messages can be directly obtained based on the reference message identifiers.

In S603, if the messages obtained after decapsulating the tunnel messages are the information messages, decompression and inverse differentiation need to be performed on the information messages. Therefore, the reference messages configured to generate the information messages need to be determined based on the reference message identifiers in the compression information headers. The receiver can directly query the corresponding relationship between the original messages and the reference message identifiers that are stored locally, and the original messages indicated by the reference message identifiers in the compression information headers are the reference messages corresponding to the information messages.

In S604, the information messages need to be decompressed first, and then inverse differentiation is performed on the decompressed messages based on the reference messages determined in S603.

Optionally, the compression information header furthers include compression algorithm identifiers. The receiver can determine compression algorithms corresponding to the information messages based on the compression algorithm identifiers and perform decompression, so as to obtain the differentiation result of the original messages and the reference messages. Then, the original message can be obtained by performing inverse differentiation based on the reference message and the differentiation result.

Figure 7:
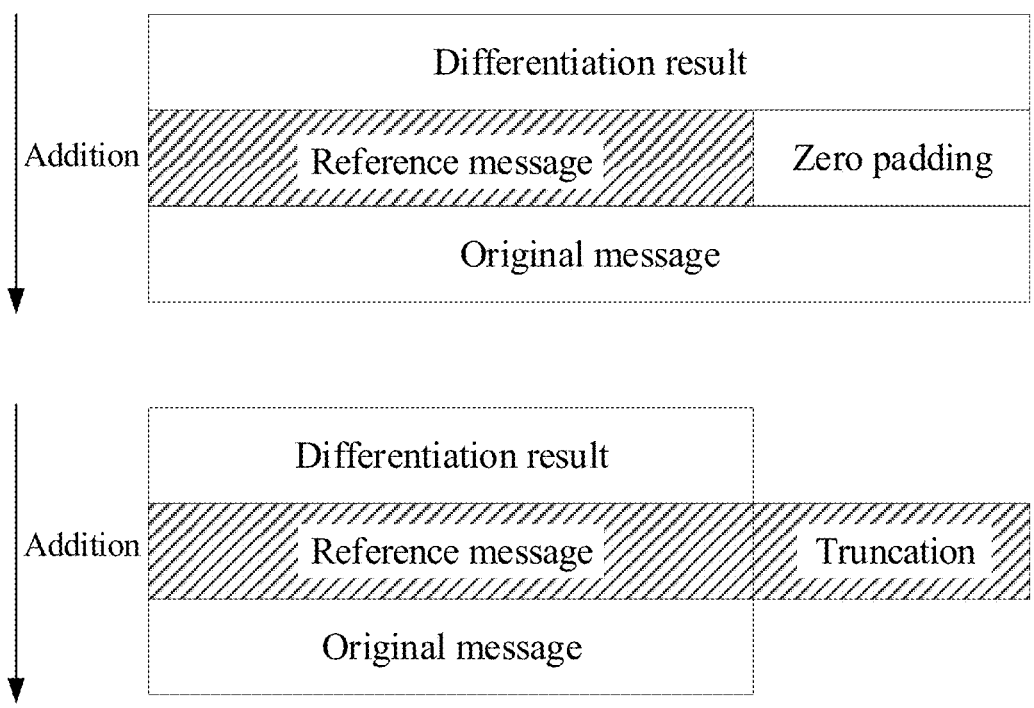
FIG. 7 is a schematic diagram of an inverse differentiation process according to an embodiment of the present disclosure.

Corresponding to the differentiation process shown in FIG. 5, an embodiment of the present disclosure further provides a feasible inverse differentiation implementation. FIG. 7 is a schematic diagram of an inverse differentiation process according to an embodiment of the present disclosure. As shown in FIG. 7, the differentiation result of the inverse differentiation does not necessarily have the same length as the reference messages. When the reference messages are relatively short, low zero padding is performed on the reference messages to make the reference messages have the same length as the differentiation result. When the reference messages are relatively long, the reference messages are truncated from the least significant bits to make the reference messages have the same length as the differentiation result. Then, addition is performed on characters at the same bits of the differentiation result and the reference messages to obtain the original messages with the same length as the differentiation result.

An embodiment of the present disclosure provides the following two feasible implementations, to separately describe the method for transmitting data and the method for processing data provided by the embodiments of the present disclosure. It should be understood that the following two feasible implementations are merely examples and do not indicate that the embodiments of the present disclosure include or are suitable for only the following two cases.

Assume that the compression algorithm identifiers separately include the following cases: 0 (non-compression), 1 (lzo algorithm), 2 (zlib algorithm), and 3 (other algorithms), and the update identifiers include the following cases: 0 (original message) and 1 (information message).

Figure 8:
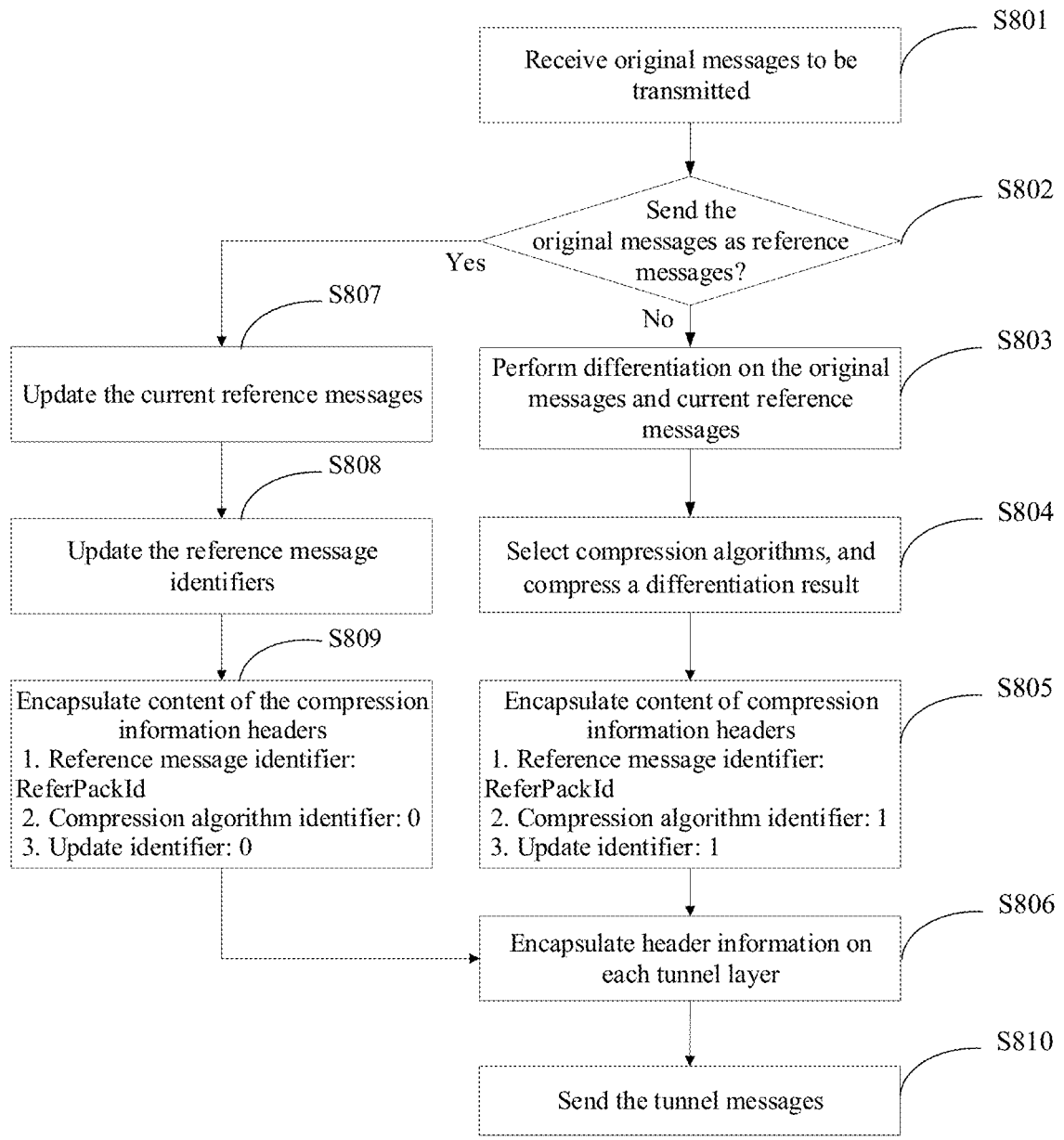
FIG. 8 is a schematic flowchart of a feasible method for transmitting data according to an embodiment of the present disclosure.

FIG. 8 is a schematic flowchart of a feasible method for transmitting data according to an embodiment of the present disclosure. As shown in FIG. 8, the method includes the following steps.

S801: Receive original messages to be sent.

S802: Determine whether to use the original messages as reference messages, that is, whether the reference message update criterion is met; and if yes, perform S807; or if no, perform S803.

S803: Perform differentiation on the original message and a current reference message.

S804: Compress the differentiation result according to preset compression algorithms, to obtain information messages.

S805: Encapsulate the compression information headers in the information messages, where the compression information headers include reference message identifiers, compression algorithm identifiers, and update identifiers.

Assume that the compression algorithms used in S804 are the lzo algorithms. In this case, the compression algorithm identifiers are 1. In addition, it can also be determined that the update identifiers are 1, indicating that the tunnel messages include the information messages.

S806: Encapsulate the header information on the other layers by using the tunneling protocols, to obtain the tunnel messages.

S807: Update the current reference messages based on the original messages.

S808: Update the reference message identifiers. For example, 1 can be directly added to the previous reference message identifiers.

S809: Encapsulate the compression information headers in the original messages.

The compression algorithm identifiers in the compression information headers are 0, indicating that the original messages are not compressed. The update identifiers are 0, indicating that the tunnel messages include the original messages used as the reference messages.

S810: Send the tunnel messages.

Figure 9:
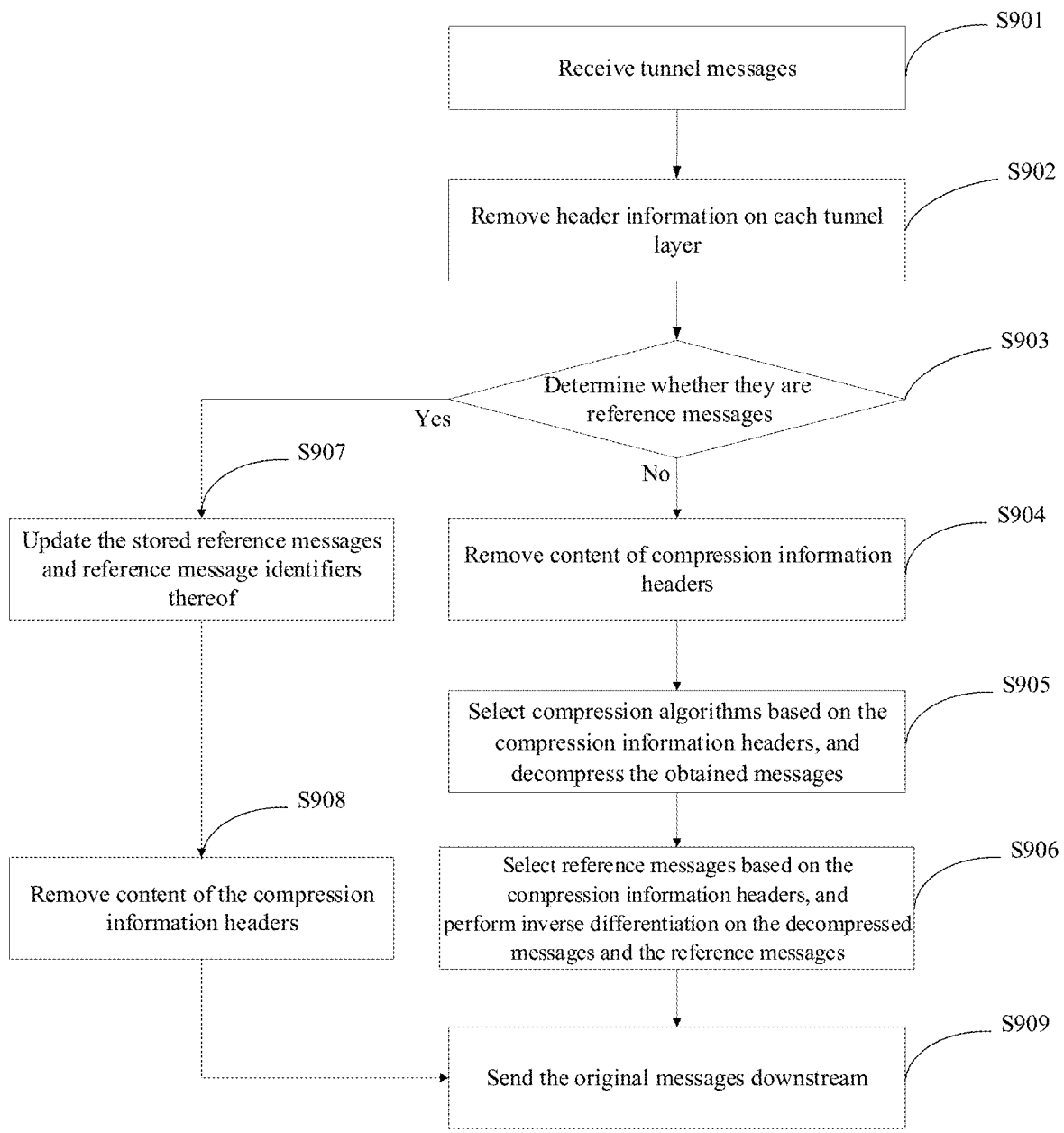
FIG. 9 is a schematic flowchart of a feasible method for processing data according to an embodiment of the present disclosure.

Based on the same assumption, corresponding to FIG. 8, FIG. 9 is a schematic flowchart of a feasible method for processing data according to an embodiment of the present disclosure. As shown in FIG. 9, the method includes the following steps.

S901: Receive the tunnel messages.

S902: Remove header information on each tunnel layer of the tunnel messages except the compression information headers.

S903: Based on the update identifiers in the compression information headers, determine whether the tunnel messages include the reference messages; and if yes, perform S907; or if no, perform S904.

S904: Remove content of the compression information headers.

S905: Select the compression algorithms based on the compression message identifiers in the compression information headers, and decompress the information messages obtained after decapsulation.

S906: Determine the reference messages based on the reference message identifiers in the compression information headers, and perform inverse differentiation on the differentiation result obtained after decompression based on the reference messages, to obtain the original messages.

S907: Update the stored reference messages (original messages) and the reference message identifiers thereof.

S908: Remove content of the compression information headers.

S909: Send the original messages downstream.

The method for transmitting data and the method for processing data provided by the embodiments of the present disclosure make full use of the correlation between original messages transmitted in the tunnels, and adopt the method of performing compression after differentiation of the similar messages, to improve the compression rate from time dimension, improve the tunnel transmission efficiency, and guarantee the bandwidth service quality to a greater extent.

Figure 10:
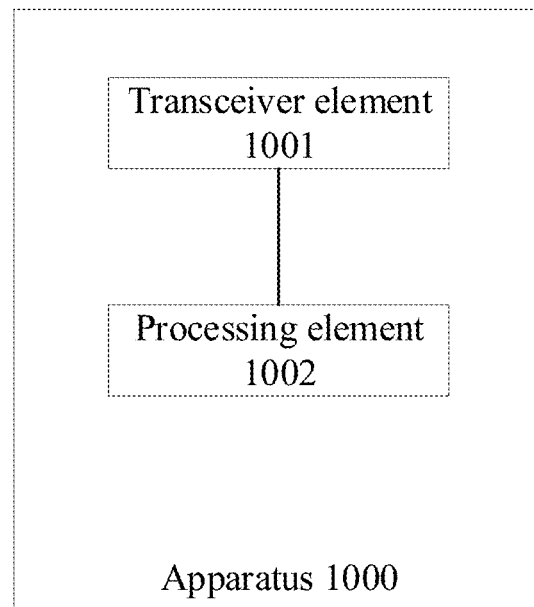
FIG. 10 is a schematic structural diagram of a data transmission apparatus according to an embodiment of the present disclosure.

Based on the same technical conception, an embodiment of the present disclosure further provides a data transmission apparatus. The apparatus can implement the data transmission method provided by any one of the foregoing embodiments. FIG. 10 is a schematic structural diagram of a data transmission apparatus according to an embodiment of the present disclosure. As shown in FIG. 10, the apparatus 1000 includes a transceiver element 1001 and a processing element 1002.

The processing element 1002 is configured to obtain the original messages to be transmitted and the current reference messages by using the transceiver element 1001, where the current reference messages and the original messages are transmitted in the same tunnel.

The processing element 1002 is further configured to differentiate and compress the original messages and the current reference messages to obtain the information messages.

The processing element 1002 is further configured to encapsulate the information messages by using the tunneling protocols to generate the tunnel messages. The tunnel messages include the compression information headers, and the compression information headers include the reference message identifiers corresponding to the current reference messages.

The processing element 1002 is further configured to control the transceiver element 1001 to send the tunnel messages.

Optionally, the processing element 1002 is further configured to: determine whether the original messages meet the reference message update criterion, and obtain the current reference messages if the original messages do not meet the reference message update criterion.

Optionally, the processing element 1002 is further configured to: If the original messages meet the reference message update criterion, update the current reference messages based on the original messages and update the reference message identifiers of the current reference messages; and encapsulate the original messages by using the tunneling protocols to generate the tunnel messages, where the tunnel messages include the compression information headers, and the compression information headers include the reference message identifiers corresponding to the current reference messages.

Optionally, the compression information headers further include the update identifiers. The update identifiers indicate that the original messages corresponding to the tunnel messages are the current reference messages.

Figure 11:
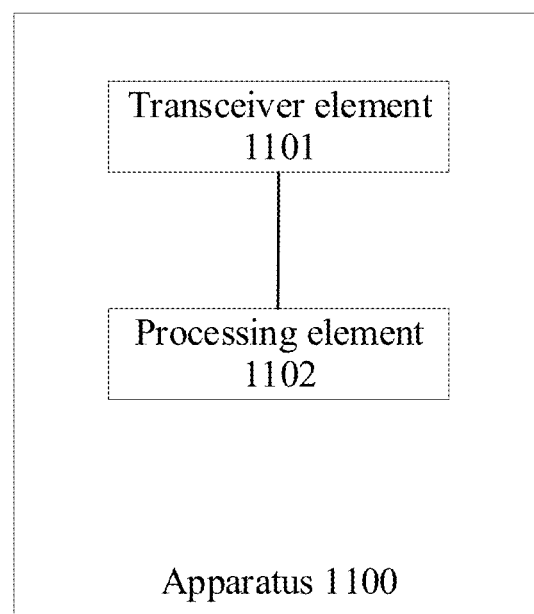
FIG. 11 is a schematic structural diagram of a data processing apparatus according to an embodiment of the present disclosure.

Based on the same technical conception, an embodiment of the present disclosure further provides a data processing apparatus. The apparatus can implement the data processing method provided by any one of the foregoing embodiments. FIG. 11 is a schematic structural diagram of the data processing apparatus according to the embodiment of the present disclosure. As shown in FIG. 11, the apparatus 1100 includes a transceiver element 1101 and a processing element 1102.

The transceiver element 1101 is configured to receive the tunnel messages.

The processing element 1102 is configured to decapsulate the tunnel messages to obtain the information messages, where the information messages are obtained by differentiating and compressing the original messages and the current reference messages, and the current reference messages and the original messages are transmitted in the same tunnel.

The processing element 1102 is further configured to obtain the current reference messages based on the reference message identifiers included in the compression information headers of the tunnel messages.

The processing element 1102 is further configured to obtain the original messages based on the information messages and the current reference messages.

Optionally, the processing element 1102 is further configured to: determine whether the update identifiers in the compression information headers of the tunnel messages are set values; and if the update identifiers in the compression information headers of the tunnel messages are the set values, decapsulate the tunnel messages to obtain the information messages.

Optionally, the processing element 1102 is further configured to: if the update identifiers in the compression information headers of the tunnel messages are not the set values, decapsulate the tunnel messages to obtain the original messages, and update the current reference messages based on the original messages.

Figure 12:
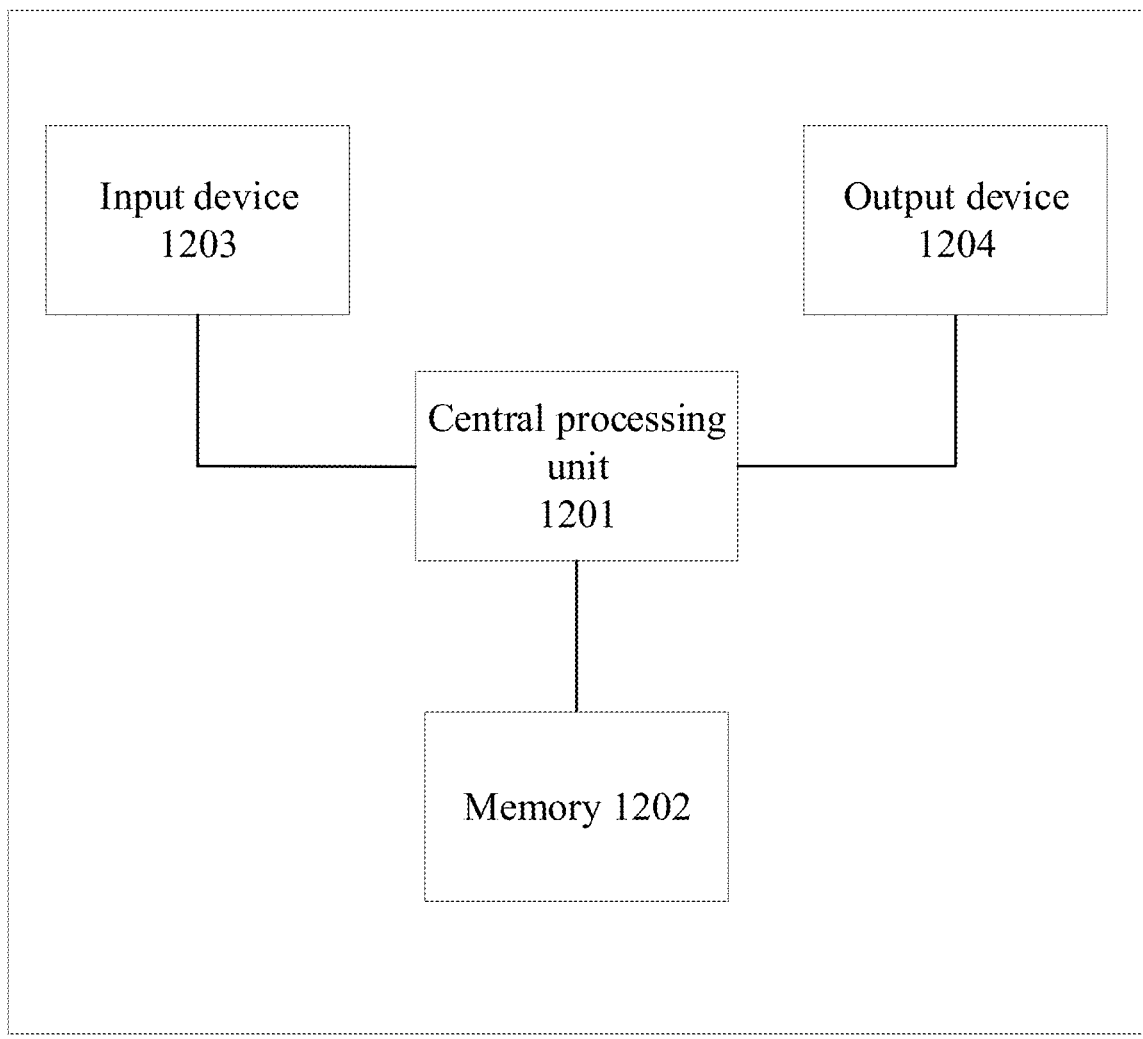
FIG. 12 is a schematic structural diagram of a computing device according to an embodiment of the present disclosure.

Based on the same technical conception, an embodiment of the present disclosure further provides a computing device. The computing device may be specifically a desktop computer, a portable computer, a smartphone, a tablet computer, a personal digital assistant (PDA), and the like. FIG. 12 is a schematic structural diagram of the computing device according to the embodiment of the present disclosure. The computing device may include a central processing unit 1201 (CPU), a memory 1202, an input device 1203, an output device 1204, and the like. The input device 1203 may include a keyboard, a mouse, a touch screen, and the like. The output device 1204 may include a display device, such as a liquid crystal display (LCD), and a cathode-ray tube (CRT).

The memory 1202 may include a read-only memory (ROM) and a random access memory (RAM), and provides a processor with program instructions and data stored in the memory. In the embodiments of the present disclosure, the memory can be configured to store programs of the data transmission method provided by the embodiments of the present disclosure, and the processor can be configured to perform any one of the data transmission methods according to the obtained program instructions by invoking the program instructions stored in the memory.

Based on the same technical conception, an embodiment of the present disclosure further provides a computer readable storage medium, configured to store the computer program instructions used by the computing device. The computer program instructions contain the programs for performing any one of the data transmission methods.

The computer storage medium may be any usable media or data storage device that the computer can access, including but is not limited to: a magnetic memory (such as a floppy disk, a hard disk, a magnetic tape, or a magneto-optical disk (MO)), an optical memory (such as a CD, a DVD, a BD, or an HVD), and a semiconductor memory (such as an ROM, an EPROM, an EEPROM, a non-volatile memory (NAND FLASH), or a solid state disk (SSD)).

Figure 13:
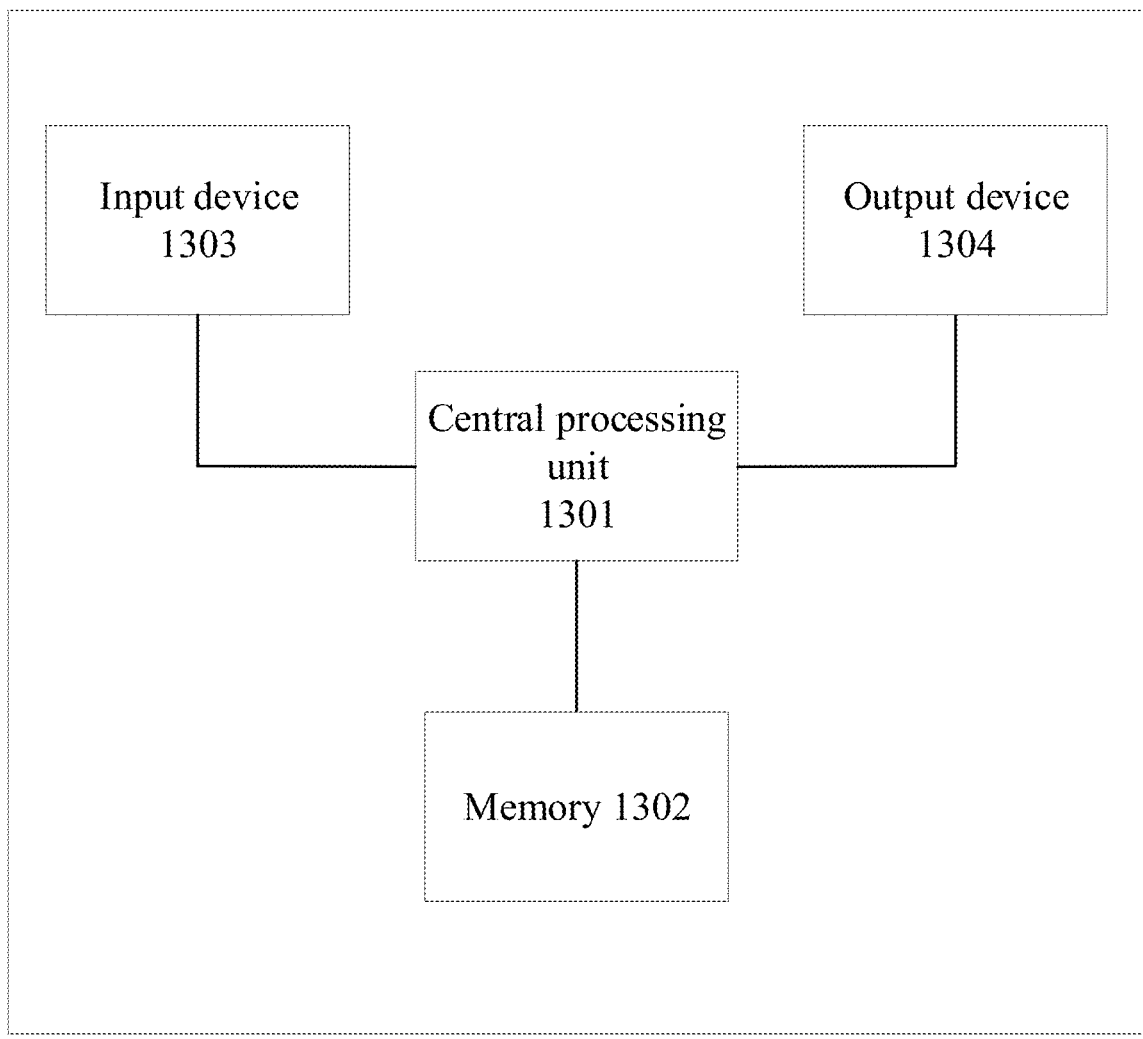
FIG. 13 is a schematic structural diagram of a computing device according to an embodiment of the present disclosure.

Based on the same technical conception, an embodiment of the present invention further provides a computing device. The computing device may be specifically a desktop computer, a portable computer, a smartphone, a tablet computer, a personal digital assistant (PDA), and the like. FIG. 13 is a schematic structural diagram of the computing device according to the embodiment of the present disclosure. The computing device may include a central processing unit 1301 (CPU), a memory 1302, an input device 1303, an output device 1304, and the like. The input device 1303 may include a keyboard, a mouse, a touch screen, and the like.

The output device 1304 may include a display device, such as a liquid crystal display (LCD) and a cathode-ray tube (CRT).

The memory 1302 may include a read-only memory (ROM) and a random access memory (RAM), and provides a processor with program instructions and data stored in the memory. In this embodiment of the present disclosure, the memory can be configured to store programs of the data processing method provided by the embodiment of the present disclosure, and the processor can be configured to perform any one of the data processing methods according to obtained program instructions by invoking the program instructions stored in the memory.

Based on the same technical conception, an embodiment of the present disclosure further provides a computer readable storage medium, configured to store the computer program instructions used by the computing device. The computer program instructions contain the programs for performing any one of the data processing methods.

The computer storage medium may be any usable media or data storage device that the computer can access, including but is not limited to: a magnetic memory (such as a floppy disk, a hard disk, a magnetic tape, or a magneto-optical disk (MO)), an optical memory (such as a CD, a DVD, a BD, or an HVD), and a semiconductor memory (such as an ROM, an EPROM, an EEPROM, a non-volatile memory (NAND FLASH), or a solid state disk (SSD)).

Based on the same inventive conception, this application provides a computer program product. The computer program product includes computer programs stored on a non-transient computer readable storage medium, where the computer programs include computer executable instructions, and when the computer executable instructions are executed by the computer, the computer performs the data transmission method or the data processing method according to any one of the embodiments.

The described apparatus embodiments are merely examples. Elements described as separate parts may or may not be physically separated, and parts displayed as the elements may or may not be physical elements, may be located in one position, or may be distributed on the plurality of physical elements. Some or all modules may be selected based on actual needs to achieve the objectives of the solutions of the embodiments. Those of ordinary skilled in the art may understand and implement the embodiments of the present disclosure without creative efforts.

Based on the description of the foregoing implementations, those of ordinary skilled in the art may clearly understand that the implementations may be implemented by software in addition to a necessary general-purpose hardware platform, or by hardware. Based on such an understanding, the foregoing technical solutions essentially or the part contributing to the related art may be implemented in a form of a software product. The computer software product may be stored in the computer readable storage medium (such as an ROM/RAM, a magnetic disk, or an optical disc), and includes several instructions for instructing a computer apparatus (which may be a personal computer, a server, a network apparatus, or the like) to perform all or some of the methods in the embodiments of the present disclosure.

The present disclosure is described with reference to the flowcharts and/or block diagrams of the method, the device (system), and the computer program product according to the embodiments of the present disclosure. It should be understood that the computer program instructions may be configured to implement each program and/or each block in the flowcharts and/or the block diagrams and a combination of the programs and/or the blocks in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate a system for implementing a specific function in the one or more programs in the flowcharts and/or in the one or more blocks in the block diagrams.

These computer program instructions may also be stored in the computer readable memory that can instruct the computer or the another programmable data processing device to work in a specific manner, so that the instructions stored in the computer readable memory generate an artifact that includes the instruction system. The instruction system implements the specific function in the one or more programs in the flowcharts and/or in the one or more blocks in the block diagrams.

These computer program instructions may also be loaded into the computer or another programmable data processing device, so that a series of operations and steps are performed on the computer or the another programmable device, thereby generating computer-implemented processing. Therefore, the instructions executed on the computer or the another programmable device provide steps for implementing the specific function in the one or more programs in the flowcharts and/or in the one or more blocks in the block diagrams.

Although some preferred embodiments of the present disclosure have been described, those of skilled in the art can make changes and modifications to these embodiments once they learn the basic inventive conception. Therefore, the following claims are intended to be construed as to cover the preferred embodiments and all changes and modifications falling within the scope of the present disclosure.

Obviously, those of skilled in the art can make various modifications and variations to the present disclosure without departing from the spirit and scope of the present disclosure. In this case, the present disclosure is intended to cover these modifications and variations provided that they fall within the scope of protection defined by the following claims and their equivalent technologies.

The invention claimed is:

1. A method for transmitting data, applied to a tunnel device in a virtual private network (VPN), and the tunnel device is configured to provide VPN service, wherein the method comprises:
    obtaining original messages to be transmitted;
    determining whether the original messages meet a reference message update criterion;
    when the original messages do not meet the reference message update criterion, obtaining current reference messages, wherein the current reference messages and the original messages are transmitted in a same tunnel;
    differentiating and compressing the original messages and the current reference messages to obtain information messages;
    encapsulating the information messages by using tunneling protocols to generate tunnel messages, wherein the tunnel messages comprise compression information headers, and the compression information headers comprise reference message identifiers corresponding to the current reference messages; and
    sending the tunnel messages;

wherein the compression information headers comprise compression algorithm identifiers comprising following cases: 0 for indicating no compression, 1 for indicating a lzo algorithm, 2 for indicating a zlib algorithm and 3 for indicating algorithms other than the lzo algorithm and the zlib algorithm.

2. The method according to claim 1, wherein the method further comprises:
when the original messages meet the reference message update criterion, updating the current reference messages based on the original messages and updating the reference message identifiers of the current reference messages; and
encapsulating the original messages by using the tunneling protocols to generate the tunnel messages.

3. The method according to claim 2, wherein the compression information headers further comprise update identifiers, and the update identifiers indicates that the original messages corresponding to the tunnel messages are the current reference messages.

4. A computer readable storage medium, wherein the computer readable storage medium stores computer executable instructions, and the computer executable instructions are configured to make a computer perform the method for transmitting data according to claim 1.

5. A computing device, wherein comprising:
a memory, configured to store program instructions; and
a processor, configured to invoke the program instructions stored in the memory, and perform the method for transmitting data according to claim 1 based on the invoked program instructions.

6. A computer program product, comprising computer programs stored on a non-transient computer readable storage medium, wherein the computer programs comprise computer executable instructions, and when the computer executable instructions are executed by a computer, the computer performs the method for transmitting data according to claim 1.

7. A method for processing data, configured to process tunnel messages sent by a tunnel device in a virtual private network (VPN), and the tunnel device is configured to provide VPN service, wherein the method comprises:
receiving tunnel messages;
determining whether update identifiers in the compression information headers of the tunnel messages are set values;
when the update identifiers in the compression information headers of the tunnel messages are the set values, decapsulating the tunnel messages to obtain information messages, wherein the information messages are obtained by differentiating and compressing original messages and reference messages, and the reference messages and the original messages are transmitted in a same tunnel;
obtaining the reference messages based on reference message identifiers comprised in compression information headers of the tunnel messages; and
obtaining the original messages based on the information messages and the reference messages;
wherein the compression information headers comprise compression algorithm identifiers comprising following cases: 0 for indicating no compression, 1 for indicating a lzo algorithm, 2 for indicating a zlib algorithm and 3 for indicating algorithms other than the lzo algorithm and the zlib algorithm.

8. The method according to claim 7, wherein the method further comprises:
when the update identifiers in the compression information headers of the tunnel messages are not the set values, decapsulating the tunnel messages to obtain the original messages, and associating and storing the original messages and the reference message identifiers in the compression information headers.

9. A data processing apparatus, comprising:
a memory, configured to store program instructions; and
a processor, configured to invoke the program instructions stored in the memory to perform the method according to claim 7.

10. The apparatus according to claim 9, wherein the processor is further configured to invoke the program instructions stored in the memory to:
when the update identifiers in the compression information headers of the tunnel messages are not the set values, decapsulate the tunnel messages to obtain the original messages, and associate and store the original messages and the reference message identifiers in the compression information headers.

11. A computer readable storage medium, wherein the computer readable storage medium stores computer executable instructions, and the computer executable instructions are configured to make a computer perform the method for processing data according to claim 7.

12. A computing device, comprising:
a memory, configured to store program instructions; and
a processor, configured to invoke the program instructions stored in the memory, and perform the method for processing data according to claim 7 based on the invoked program instructions.

13. A computer program product, comprising computer programs stored on a non-transient computer readable storage medium, wherein the computer programs comprise computer executable instructions, and when the computer executable instructions are executed by a computer, the computer performs the method for processing data according to claim 7.

14. A data transmission apparatus, applied to a tunnel device in a virtual private network (VPN), and the tunnel device is configured to provide VPN service, wherein the apparatus comprises:
a memory, configured to store program instructions; and
a processor, configured to invoke the program instructions stored in the memory to:
obtain original messages to be transmitted;
determine whether the original messages meet a reference message update criterion;
when the original messages do not meet the reference message update criterion, obtain current reference messages by using a transceiver, wherein the current reference messages and the original messages are transmitted in a same tunnel;
differentiate and compress the original messages and the current reference messages to obtain information messages;
encapsulate the information messages by using tunneling protocols to generate tunnel messages, wherein the tunnel messages comprise compression information headers, and the compression information headers comprise reference message identifiers corresponding to the current reference messages; and
control the transceiver to send the tunnel messages;
wherein the compression information headers comprise compression algorithm identifiers comprising following cases: 0 for indicating no compression, 1 for indicating a lzo algorithm, 2 for indicating a zlib algorithm and 3 for indicating algorithms other than the lzo algorithm and the zlib algorithm.

15. The apparatus according to claim 14, wherein the processor is further configured to invoke the program instructions stored in the memory to:

when the original messages meet the reference message update criterion, update the current reference messages based on the original messages and update the reference message identifiers of the current reference messages; and encapsulate the original messages by using the tunneling protocols to generate the tunnel messages.

16. The apparatus according to claim 15, wherein the compression information headers further comprise update identifiers, and the update identifiers indicates that the original messages corresponding to the tunnel messages are the current reference messages.

* * * * *